(12) United States Patent
Balachov et al.

(10) Patent No.: US 8,450,000 B2
(45) Date of Patent: May 28, 2013

(54) RAPIDLY RECHARGEABLE BATTERY

(75) Inventors: Iouri I. Balachov, Menlo Park, CA (US); Ronald H. Wolk, San Jose, CA (US); J. Robert Selman, Chicago, IL (US)

(73) Assignee: 4D Energetics, Inc., Menlo Park, CA (US)

( * ) Notice: Subject to any disclaimer, the term of this patent is extended or adjusted under 35 U.S.C. 154(b) by 0 days.

(21) Appl. No.: 13/527,509

(22) Filed: Jun. 19, 2012

(65) Prior Publication Data

US 2012/0258344 A1    Oct. 11, 2012

Related U.S. Application Data

(63) Continuation of application No. 12/712,009, filed on Feb. 24, 2010, now Pat. No. 8,202,640.

(51) Int. Cl.
*H01M 10/34* (2006.01)
*H01M 10/52* (2006.01)
*H01M 4/82* (2006.01)

(52) U.S. Cl.
USPC ........................... 429/57; 429/231.8; 29/623.2

(58) Field of Classification Search
USPC ..... 429/57–60, 94, 112, 209, 231.8; 29/623.2
See application file for complete search history.

(56) References Cited

U.S. PATENT DOCUMENTS

2004/0157127 A1*   8/2004   Choi et al. ................. 429/231.8
2004/0185330 A1*   9/2004   Yamaguchi et al. ............ 429/59

OTHER PUBLICATIONS

H.F. Morley, "On Grove's Gas-Battery", Proc. Phys. Coc. 1875, London, 2, 212-223.
Notice of Allowance mailed Apr. 23, 2012 in co-pending U.S. Appl. No. 12/712,009 of Balachov et al., filed Feb. 24, 2010.

* cited by examiner

*Primary Examiner* — Carlos Barcena
(74) *Attorney, Agent, or Firm* — Perkins Coie, LLP (57) ABSTRACT

Design of a rapidly rechargeable gas battery is disclosed. In one embodiment, a rapidly rechargeable gas battery is constructed of a plurality of high surface area, gas adsorbing electrodes and an electrolyte, wherein, during charging operation, gases are formed and adsorbed at the plurality of electrodes such that they generate an electrochemical potential for discharge of the cell formed by electrodes and electrolyte until the state-of-charge has become negligible (deep discharge). The rapidly rechargeable gas battery is designed such that it can withstand high charging current and a deep discharge without irreversible changes in the electrode materials.

39 Claims, 8 Drawing Sheets

| Gas | Boiling Temperature, °C | Amount of Gas Adsorbed, $cm^3$ |
|---|---|---|
| $SO_2$ | -10 | 380 |
| $Cl_2$ | -34 | 235 |
| $NH_3$ | -33 | 181 |
| $H_2S$ | -60 | 99 |
| $CO_2$ | -79 | 48 |
| $O_2$ | -183 | 8 |
| $H_2$ | -253 | 5 |

RAPIDLY RECHARGEABLE BATTERY

CLAIM OF PRIORITY

This application is a continuation of U.S. patent application Ser. No. 12/712,009, entitled "RAPIDLY RECHARGEABLE BATTERY", filed Feb. 24, 2010, the contents of which are expressly incorporated by reference herein.

FIELD

The following disclosure generally relates to devices for electrochemical energy generation (e.g., fuel cells and batteries), and more specifically to rapidly rechargeable gas batteries that are tolerant to fast charging and deep discharging.

BACKGROUND

Any battery consists of two electrodes, an anode and a cathode, and some form of electrolyte. The electrodes are typically made of electrochemically active materials. Electrolytes can be liquid, gel, or other materials capable of conducting electric current. Once the electrodes are immersed into the electrolyte, electrochemical reactions take place and current will flow upon connecting an external load between the electrodes.

Gas bubbles evolving from electrodes in batteries may be observed during charging and discharging. The phenomenon has been observed in lead-acid and Ni/Cd batteries for example. This gas evolution does not contribute to the intended energy storage and power generation by the battery. In fact, it may be detrimental to the proper functioning of the battery where the voltage should be determined only by the chemical energy of the reactants stored in the electrode materials. However, gases also have electrochemical potential. This fact may be used for making a battery in which immobilized gases stored in or at the electrodes are the working materials (reactants). Such a battery is called a gas battery, while a similar device that uses flowing gases as reactants is called a fuel cell.

The concept of a gas battery operating on immobilized gases as reactants during discharge was demonstrated by Sir William Grove in 1839. The same well-known experiment led later to development of the fuel cell which is fed by flowing gases as reactants. Grove's gas battery consisted of two platinum spiral electrodes immersed in sulfuric acid electrolyte. During battery charging, hydrogen was adsorbed on one electrode and oxygen on another. Grove's experiments laid the conceptual basis for the development of both the gas battery and the fuel cell. Thus far, only the fuel cell has become well-known as a potential highly efficient continuous power generator. The combination of materials used by Grove in his experiment was not suitable for development of a gas battery, that is, an energy generator based on storing gases as reactants, although the device he operated clearly demonstrated the concept of a highly efficient pulse-power generator. While some activity related to development of gas batteries was reported in the 1950-1960s, it never led to a commercial device because of inherent limitations of the electrode materials available at that time.

SUMMARY

At least one embodiment of this disclosure pertains to a rapidly rechargeable gas battery.

In one embodiment, a rapidly rechargeable gas battery is constructed of a plurality of high surface area, gas adsorbing electrodes and an electrolyte, wherein, during charging, gases are formed and adsorbed at the plurality of electrodes creating an electrochemical potential. The rapidly rechargeable gas battery is designed to withstand high charging current and a deep discharge without irreversible changes in the electrode materials.

In another embodiment the high surface area, gas adsorbing electrodes are made of different materials to increase the adsorption of gases. Further, the electrodes may be of similar or differing geometry to improve gas adsorption.

In yet another embodiment separate anode and cathode compartments may be created by inserting a membrane between the electrodes. These separate compartments allow for a different electrolyte to be used by each electrode to increase adsorption and thereby increase battery capacity.

A permselective membrane may be disposed on the electrodes to prevent working gases adsorbed on the electrodes to be spontaneously desorbed into the electrolyte resulting in self discharge of the battery.

The electrolyte used in various embodiments of the disclosure can be selected to maximize adsorption at the electrodes. The electrolyte can be organic or inorganic in nature and the ions which carry the electric current can be simple or complex.

These and other objects, features and characteristics of the present invention will become more apparent to those skilled in the art from a study of the following detailed description in conjunction with the appended claims and drawings, all of which form this specification.

DETAILED DESCRIPTION

Those of skill in the art will appreciate that the invention may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

Although the concept of a gas battery is well established historically, the concept of an advanced, high-performance gas battery as claimed in this patent is made possible only by recent advances such as the creation of nano-materials. A practical format for storing in-situ developed gas in commercially competitive devices is provided only by materials with extremely high interfacial area such as nano-materials. Many of these materials also are characterized by excellent electrochemical reversibility when used as substrates for gas production and consumption. Gas batteries with these combined characteristics of high energy density and excellent catalytic reactivity can play a very important role in electric vehicle technology. For example, the charging time of gas batteries will be orders of magnitude shorter than that of solid-state based advanced batteries including lithium ion and nickel metal hydride batteries. Gas batteries also may be deep-cycled unlike most existing advanced batteries.

The major advantages of a gas battery, particularly for automotive applications, are tolerance to fast charging and deep discharging, simplicity, low cost, light weight, and long shelf life. Most importantly a gas battery according to this disclosure can endure a high charging current. This means drastically reduced charging times. Similarly, a gas battery can sustain high discharge currents and deep discharging. Other batteries subjected to these conditions would suffer irreversible changes in electrode materials.

In one embodiment, a gas battery operates using reversible oxidation and reduction reactions. During battery charging, electrolysis of the electrolyte takes place at the electrodes, which produces gases. These gases may be adsorbed on the electrodes if the electrodes are made of adsorbing material. One example of an adsorbing material is activated carbon. A reverse process takes place during battery discharge.

Figure 1:
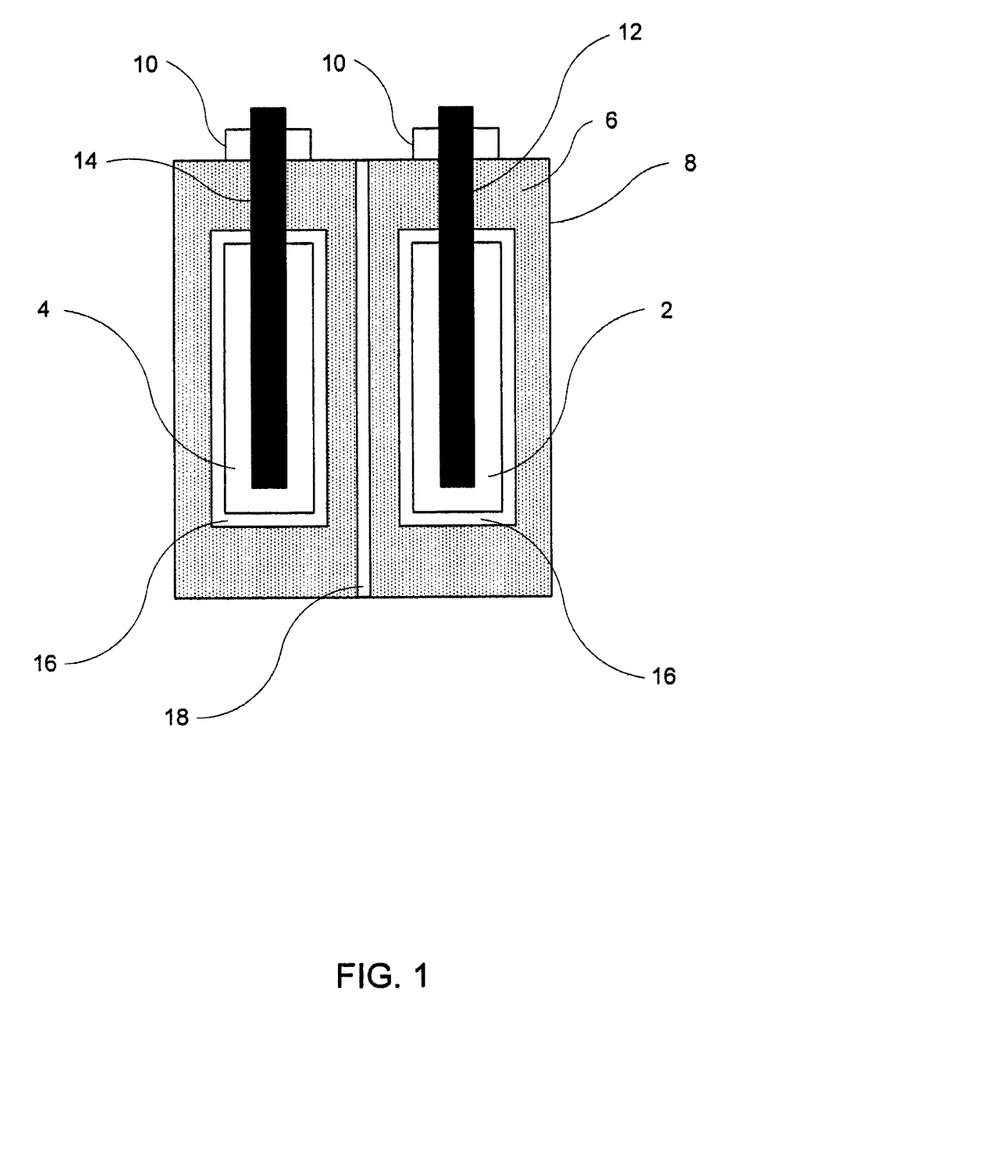
FIG. 1 shows an example of a gas battery that is constructed according to the technique described herein.

FIG. 1 shows an example of a gas battery that is constructed according to the techniques described herein. While specific materials and solutions are mentioned in the description of FIG. 1 it will be apparent to one of skill in the art that other materials and solutions may be substituted and this description is in no way limiting. It will further be apparent that not all embodiments falling within the scope of this disclosure are specifically described.

The example of FIG. 1 includes electrodes 2 and 4 which can be either an anode or a cathode. The electrodes are preferably made from an adsorbing material such as, but not limited to, activated carbon. Tunable nano-porous carbon, or another high surface area adsorbent created using nano-technology or other technology can be used to increase the adsorption of the gases created during charging. Advances in nano-materials have led to materials with specific surface area much greater than 500 m$^2$/g. The electrodes may be made of the same or different adsorbing materials to maximize adsorption capability thereby increasing battery capacity.

Similarly, the electrodes may be of the same or different geometry. Different geometries can be used to attain greater adsorption of the working gas at the electrode. Further, various geometries and configurations can be used to maximize charging current without bubble evolution. Examples of electrode geometry include cylindrical, planar, and spherical electrodes; examples of configurations are concentric and parallel electrodes.

The electrodes 2 and 4 are housed in a gas tight vessel 8. The vessel is sealed with gas tight fittings 10. As will be appreciated, any suitable composition and structure for the vessel and gas tight fittings may be used. For, example, plastic would be suitable.

In one embodiment the gas tight vessel 8 is filled with a liquid electrolyte 6 surrounding the electrodes 2 and 4. This electrolyte can be any solution of chemical compounds which form positive and negative ions. The ions may be simple or complex. Additives may be introduced into the electrolytes to improve performance. An example of electrolyte is a solution of NaCl in water. Working gases is this case could be hydrogen and chlorine.

This combination of highly adsorbing electrodes and reversible reactions that generate and decompose adsorbed gases at the electrodes are key requirements for practicality of a gas battery. Another key requirement is to provide enough ionic capacity in the form of electrolyte to achieve practically interesting levels. However, a large cell volume between the electrodes would result in poor power density. In principle, a compromise can be achieved by optimizing the shape and configuration of the electrodes. Alternatively, a cell with flowing electrolyte (flow battery) can be used, however, the well-known drawbacks of flow-type batteries are various engineering, materials, and cost issues that may be hard to overcome.

In another embodiment, the vessel can be divided by optional membrane 18 to create separate electrolyte compartments for the electrodes 2 and 4. The membrane can be of any suitable construction. However, ideally the membrane should be impermeable to the liquid electrolyte 6. The creation of separate electrolyte compartments for the anode and the cathode of the gas battery allows for use of electrolytes having different chemical compositions in each compartment. Having different electrolytes in the anode and cathode compartments can maximize adsorption, and thereby battery capacity, by selecting ideal working gases for each electrode.

In yet another embodiment, optional permselective membrane 16 can be disposed around the electrodes to prevent the adsorbed working gases from being spontaneously desorbed back into the electrolyte resulting in self discharge. The working gases considered to be effective for use in a high capacity gas battery are highly soluble in the electrolyte. For example, a gas battery constructed according to the example provided in this disclosure with a solution of NaCl and water as electrolyte was found to have a self discharge rate approximately ten times higher than a commercial NiMH battery.

The permselective membrane 16 can be selected to be substantially impermeable to the working gas created in electrolyte 6. Further, if a different electrolyte is used in the anode and cathode compartments the permselective membrane surrounding each of the electrodes can be of different materials to optimize performance with the working gases found in each compartment.

Electrically conductive components 12 and 14 are electrically connected to the electrodes 2 and 4 and enable redox reactions at the electrodes. Any suitable conductive material, such as graphite, can be used to construct these electrically conductive components.

A simple, non-limiting, example of FIG. 1 in operation is described below. The electrolyte for this example includes a simple water solution of table salt and the electrodes include activated carbon, preferably with a high surface area. In practice the electrolyte may be any solution which contains positive and negative ions. Similarly, the electrodes may be of any composition or geometry as apparent to one skilled in the art.

One advantage of the batteries according to this invention is the long shelf life. Prior to operation this battery may be stored in one of several states including dry, charged, and discharged. If the battery is stored dry, the electrolyte must be introduced prior to usage.

A current applied across the electrodes 2 and 4, through the graphite rods 12 and 14, charges the battery. During charging, the H$^+$ and Cl$^-$ ions in simple electrolyte 6 of this example will be consumed to form hydrogen gas and chlorine gas at the electrodes.

$$2NaCl + 2H_2O \leftrightarrow H_2 + 2NaOH + Cl_2$$

The hydrogen gas created during this charging cycle will be adsorbed on one electrode 2 and the chlorine gas will be adsorbed on the other electrode 4.

When a load, for example the electric motor of an automobile, is connected across the electrodes 2 and 4 through the graphite rods 12 and 14, the battery is discharged. During discharge, or a load cycle, the gases will be desorbed from the electrodes and the reaction described above, with regard to the charge cycle, will proceed in the reverse direction.

$$H_2 + 2NaOH + Cl_2 \Leftrightarrow 2NaCl + 2H_2O$$

Figure 2:
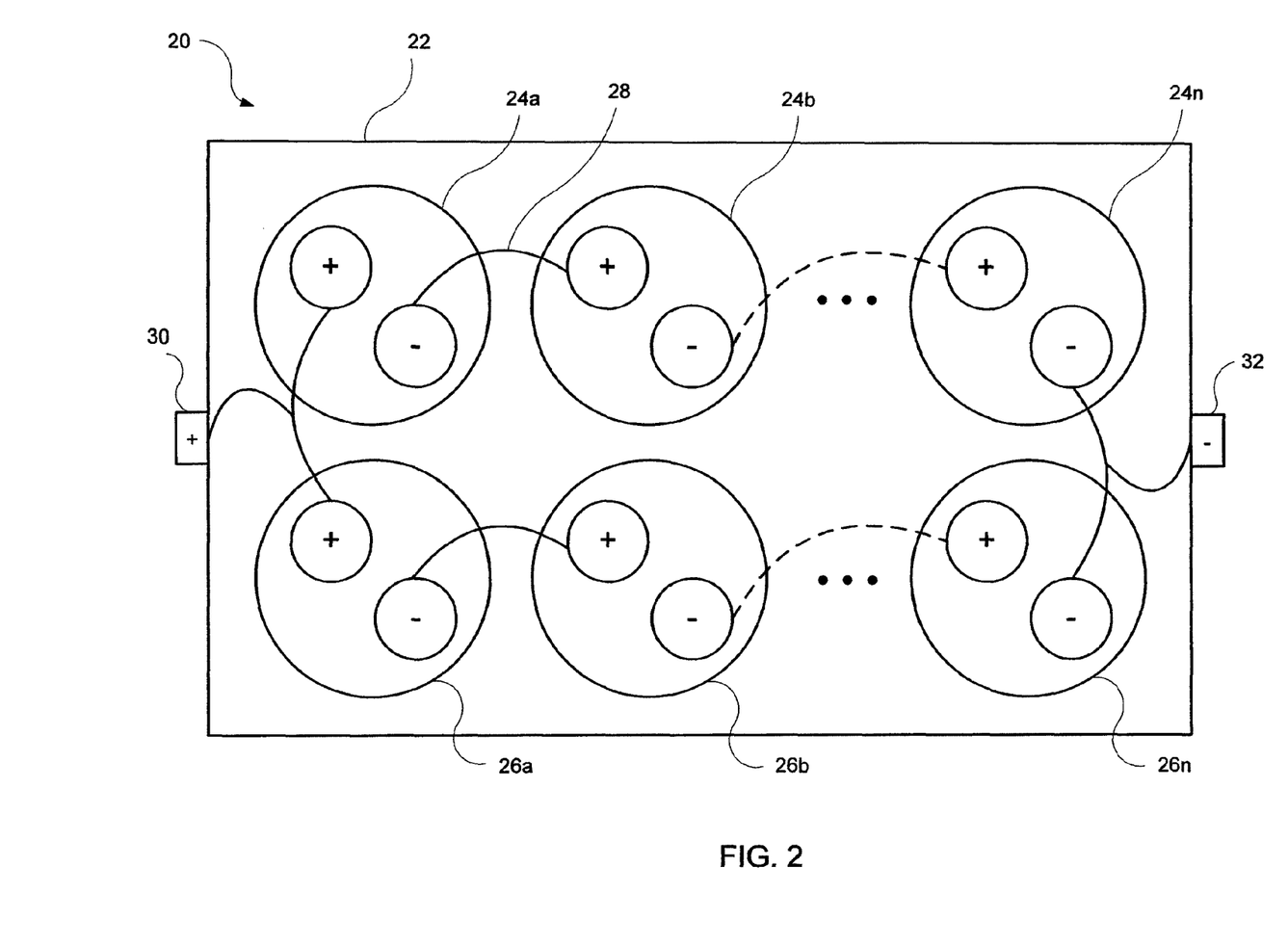
FIG. 2 shows an example of a multi cell battery composed of gas battery cells.

FIG. 2 shows an example of a multi-cell battery 20 composed of multiple gas battery cells. In one embodiment the individual cells of the battery shown in FIG. 2 can be constructed similarly to the battery described above in reference to FIG. 1. Further, the individual battery cells in FIG. 2 may be configured in series, parallel, or a combination of the two in order to deliver the desired voltage and current.

In the example of FIG. 2 the cells 24a-24n and 26a-26n of the multi-cell battery are contained in an outer enclosure 22 which may be of various constructions. The terminals of the various cells in the example of FIG. 2 are connected in a series/parallel combination. The connecting elements 28 may be of any conductive material that is suitable for the application. The connecting elements connect the terminals of the various battery cells to external terminals 30 and 32 on the outer enclosure to provide for the load or charger to be connected. In other embodiments the multi-cell battery may contain cell balancing electronics to improve performance and battery life.

Figure 3:
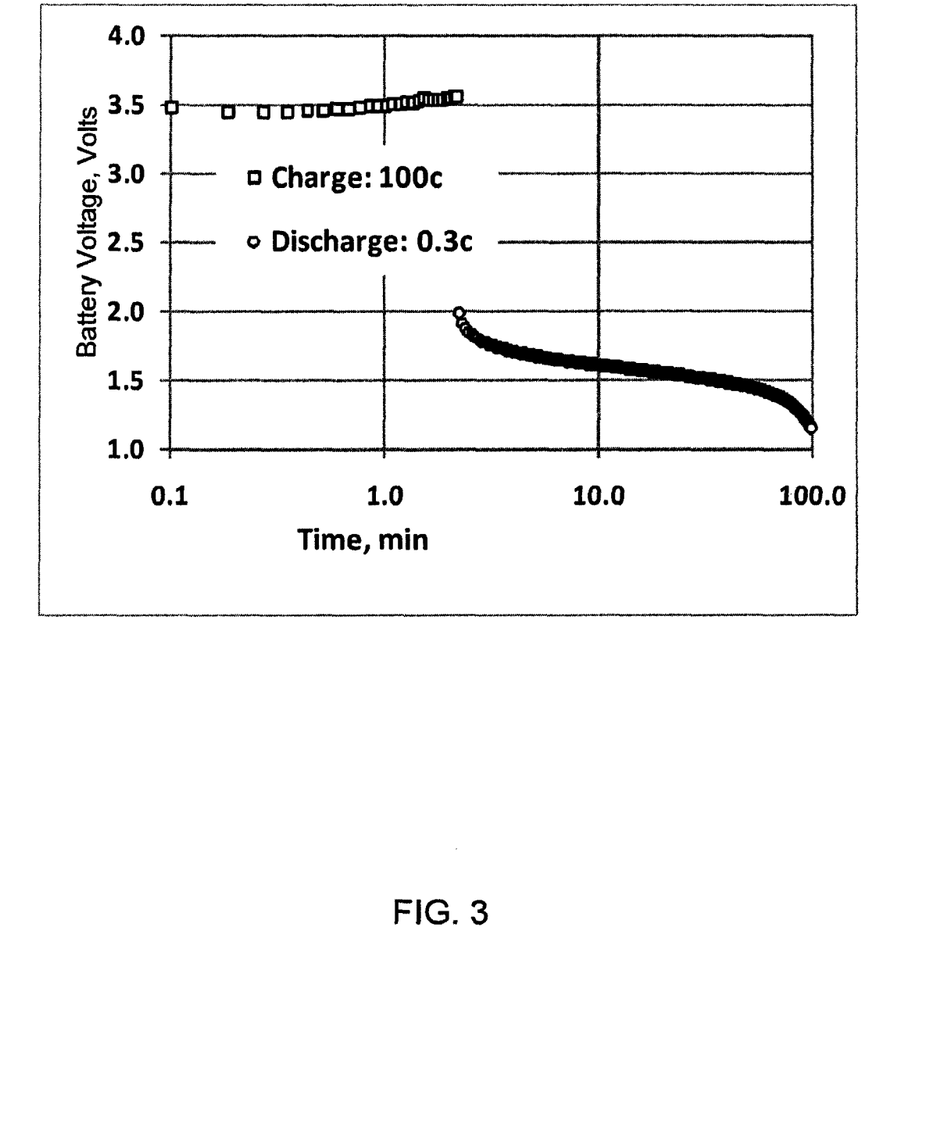
FIG. 3 shows a graph depicting a charge and discharge cycle of an exemplary gas battery constructed according to the technique described herein.

FIG. 3 shows a graph depicting a charge and discharge cycle of a gas battery constructed according to the example above with a simple NaCl electrolyte solution. Operation of the battery in the charging mode shows its ability for quick charge with minimal polarization.

During discharge an almost ideal Nernstian behavior is observed over long discharge times suggesting the potential for high energy density. Further, the battery according to this invention allows for deep discharging without damage to the electrodes.

A gas battery constructed according to this disclosure, having an electrolyte solution of water and NaCl and activated carbon electrodes, was further tested for endurance over a series of charge-discharge cycles. The endurance testing was automated with a battery analyzer and charger controlled by a computer. Prior to the endurance test the capacity of the battery was experimentally estimated as 0.5 mA-h.

Figure 4:
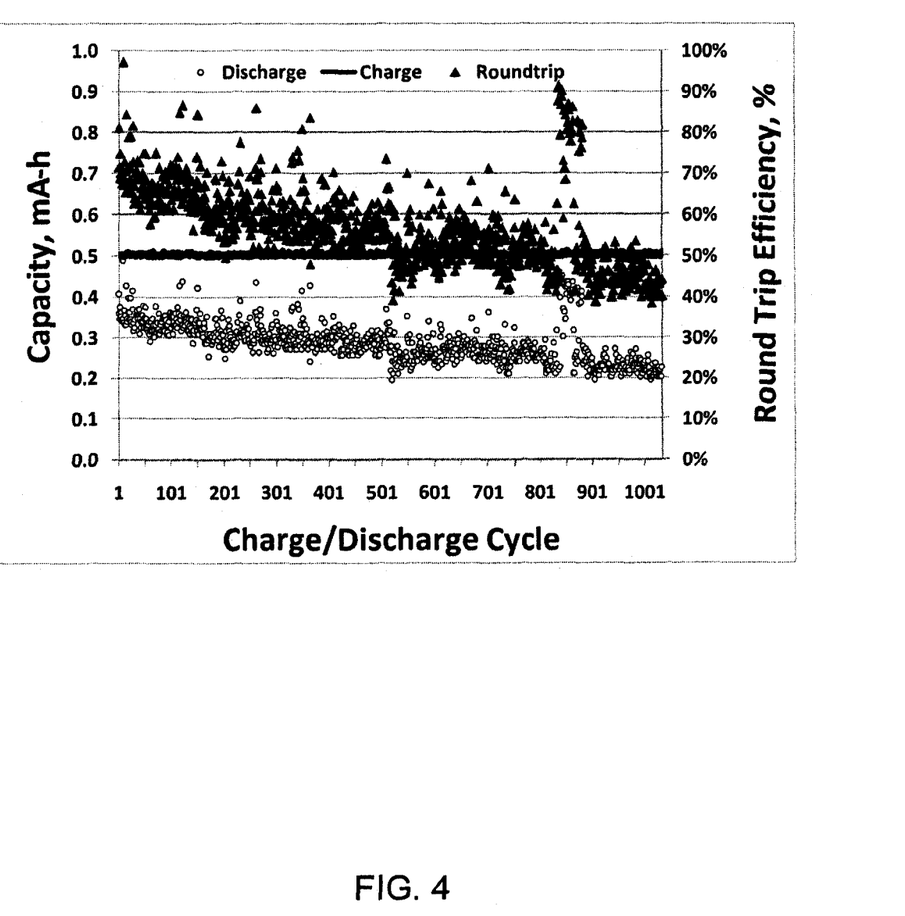
FIG. 4 shows a graph of experimental results of battery endurance during 1,000 charge/discharge cycles of an exemplary gas battery constructed according to the technique described herein.

FIG. 4 shows the data from the endurance test comprised of 1,000 charge-discharge cycles. The charge current was set at 25 mA or approximately 50 c. Charging was stopped when the battery capacity of 0.5 mA-h was reached. The battery was then discharged at a current of 25 mA or approximately 50 c. Discharging was stopped when the battery voltage dropped below 0.3 V. The battery voltage at the beginning of each discharge cycle was 1.5-2 V. Discharge capacity was calculated for each charge-discharge cycle and round trip efficiency was estimated for each cycle as discharge capacity over charge capacity.

Figure 5:
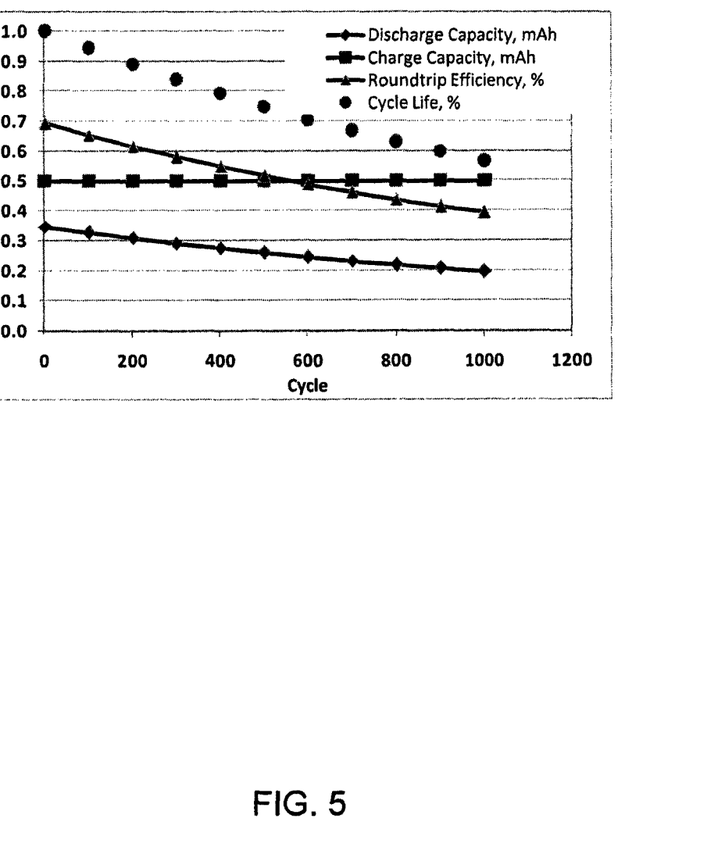
FIG. 5 shows a graph of the data in FIG. 4 on second order regression and a battery cycle lifetime calculated from the data.

FIG. 5 shows the experimental data of FIG. 4 approximated with a second order regression. The battery cycle life was calculated from the discharge capacity as a percentage of the initial discharge capacity. The battery lifetime was estimated as the number of charge/discharge cycles when the discharge capacity dropped below 80% of its initial value. From the estimated data of FIG. 5 the cycle life of the test battery was approximately 400 cycles.

Figure 6:
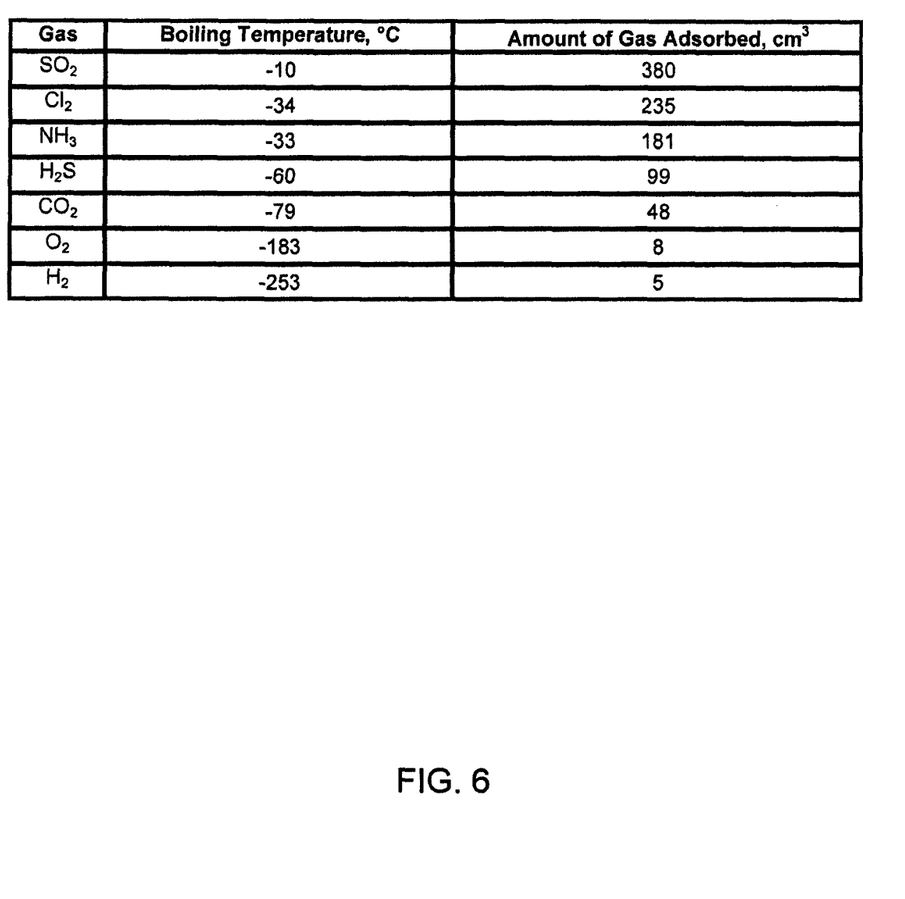
FIG. 6 is a table of potential gases and the various boiling temperatures and absorption rates associated with them.

FIG. 6 is a table showing the adsorption of various gases by one gram of activated carbon at 15° C. Different electrolytes produce different gases. These working gases are adsorbed and desorbed at different capacities by different materials. For example the adsorption of carbon dioxide ($CO_2$) by activated carbon is an order of magnitude higher than adsorption of hydrogen ($H_2$). Selection of working gases is important in order to increase the specific energy density of gas batteries.

Data on adsorption of various gases by activated carbon suggest that gases with a higher boiling point may be more attractive candidates. Examples of candidate working gases are, but are not limited to, $SO_2$, $Cl_2$, $NH_3$, $H_2S$, $CO_2$, $O_2$, $H_2$. Preferably the electrodes have an adsorption capacity of the working gas as high as possible. The adsorption capacity of the working gas on the electrodes is preferably greater than 50 $cm^3/g$.

Figure 7:
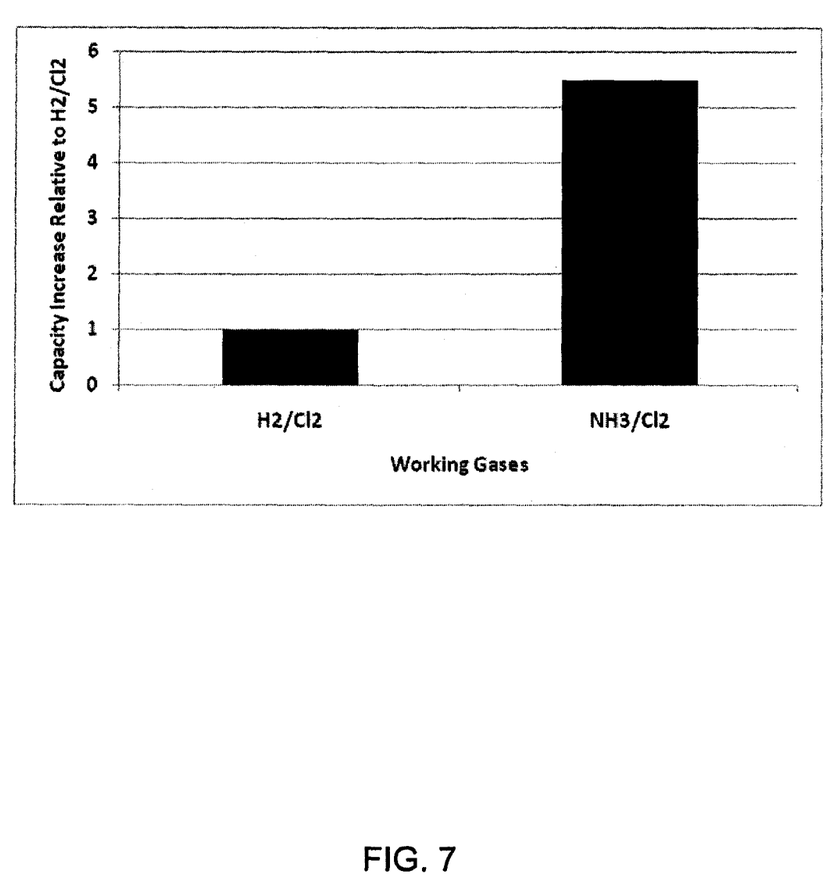
FIG. 7 shows a chart of experimental results on the impact of working gas selection on battery capacity.

The effect of working gas selection on battery capacity was experimentally tested. A second example battery, using $Cl_2$ and $NH_3$ as working gases instead of $Cl_2$ and $H_2$, was constructed. This was accomplished by using a saturated solution of $NH_4Cl$ in water as electrolyte. The measured capacity of the example $Cl_2/NH_3$ battery was observed to be 5.5 times higher than for the $Cl_2/H_2$ battery. This increase in capacity is shown in FIG. 7. The observed increase in capacity demonstrates importance of selection of working gases to maximize battery capacity.

In addition to using a single electrolyte compartment, anode and cathode compartments separated by a membrane may be used as described with reference to an embodiment of FIG. 1. The chemical composition of the electrolyte in the anode and cathode compartments may be different. In the case where different electrolytes are used in the anode and cathode compartments the membrane should be impermeable to the liquids comprising the electrolytes.

Figure 8:
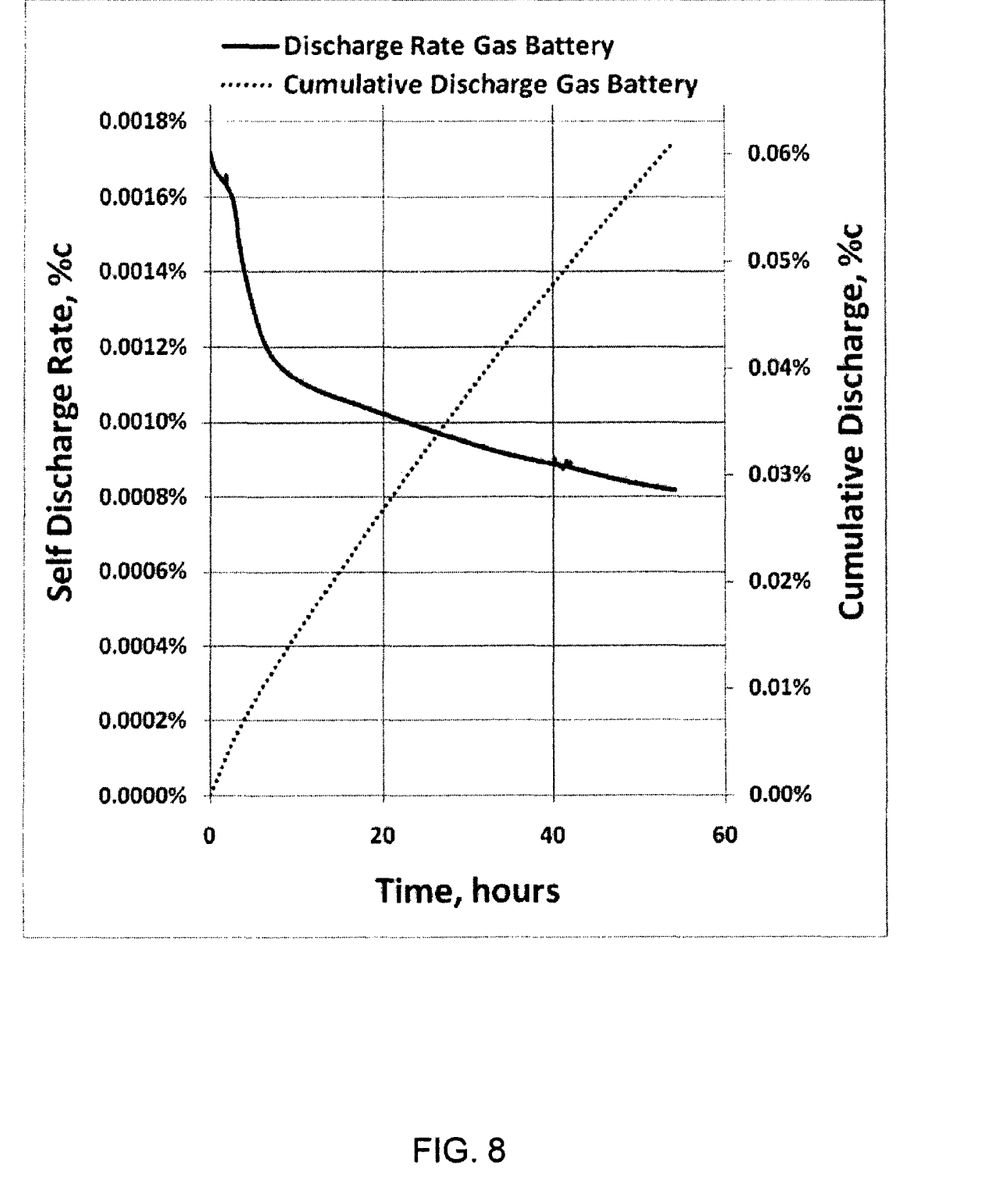
FIG. 8 shows a graph of measured self discharge rate and cumulative self discharge of an exemplary gas battery constructed according the technique described herein.

Another important parameter of any battery is self discharge rate. The example gas battery of FIG. 1 with a NaCl electrolyte was tested for self discharge by keeping the fully charged battery at open circuit and measuring self discharge current and voltage decline. Self discharge tests were performed by charging the battery with a 25 mA current until the capacity of 0.5 mA-h was reached. Discharge current and open circuit voltage were then monitored until the battery voltage dropped below 1 V. Experimental results are shown in FIG. 8. A commercial NiMH battery was tested for self discharge under the same conditions. The measured self discharge of gas battery was found to be 9.8 times higher than the measured self discharge of the commercial NiMH battery. Self discharge rate may be reduced by selection of active ingredients of the electrolyte.

The operation of a gas battery with complex chemistry, such as $Cl_2/NH_3$ battery, for example, will require special measures to be taken against high self discharge. One option to reduce self discharge is to incorporate a permselective membrane surrounding the electrode. Such a membrane should be impermeable to gases formed during electrolysis.

Operation of the battery at pressures above atmospheric and temperatures below or above room temperature may also improve performance by maximizing adsorption during charging and minimizing desorption in a no load state (self discharge).

The description and drawings provided herein show exemplary embodiments of the invention. It will be appreciated to those skilled in the art that the preceding examples and embodiments are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A rapidly rechargeable battery utilizing chemical energy of gases comprising:
   an electrolyte; and
   a plurality of gas adsorbing electrodes immersed in the electrolyte, each electrode having a specific surface area greater than 500 $m^2$/g, wherein during charging, gases are adsorbed on the plurality of electrodes;
   wherein the electrolyte includes a solution of chemical compounds which form positive and negative ions, and
   further wherein the ions form gases on the plurality of electrodes via electrolysis process during charging; the battery utilizing the chemical energy of gases.

2. The rapidly rechargeable battery of claim 1 further comprising a permselective membrane disposed around each electrode, wherein the permselective membrane is substantially impermeable to the gases adsorbed on the electrodes.

3. The rapidly rechargeable battery of claim 1 further comprising separate electrode compartments for each electrode.

4. The rapidly rechargeable battery of claim 3 wherein the electrolyte in each electrode compartment has a different chemical composition.

5. The rapidly rechargeable battery of claim 1 wherein the ions include simple ions.

6. The rapidly rechargeable battery of claim 1 wherein the ions include complex ions.

7. The rapidly rechargeable battery of claim 1 wherein each of the plurality of electrodes includes an electrically conductive component to enable redox reactions at the plurality of electrodes.

8. The rapidly rechargeable battery of claim 7 wherein the electrically conductive component includes graphite.

9. The rapidly rechargeable battery of claim 1 wherein the plurality of electrodes include the same material.

10. The rapidly rechargeable battery of claim 1 wherein the plurality of electrodes each include different materials.

11. The rapidly rechargeable battery of claim 1 wherein the plurality of electrodes have a cylindrical geometry.

12. The rapidly rechargeable battery of claim 1 wherein the plurality of electrodes have a planar geometry.

13. The rapidly rechargeable battery of claim 1 wherein the plurality of electrodes have a spherical geometry.

14. The rapidly rechargeable battery of claim 1 wherein the plurality of electrodes have a parallel configuration.

15. The rapidly rechargeable battery of claim 1 wherein the plurality of electrodes have a concentric configuration.

16. The rapidly rechargeable battery of claim 1 wherein the plurality of electrodes have varied geometries.

17. The rapidly rechargeable battery of claim 1 wherein the plurality of electrodes are constructed of materials including activated carbon.

18. The rapidly rechargeable battery of claim 1 wherein the plurality of electrodes are constructed of materials including tunable nanoporous carbon.

19. The rapidly rechargeable battery of claim 1 wherein the plurality of electrodes are constructed of materials including gas adsorbing nano-materials.

20. The rapidly rechargeable battery of claim 1 wherein the gases formed during charging are selected to be effectively adsorbed on the plurality of electrodes and desorbed from the plurality of electrodes during discharging.

21. The rapidly rechargeable battery of claim 20 wherein the gases formed are selected from the group consisting of: $SO_2$, $Cl_2$, $NH_3$, $H_2S$, $CO_2$, $O_2$, and $H_2$.

22. The rapidly rechargeable battery of claim 1 wherein the electrolyte includes organic components.

23. The rapidly rechargeable battery of claim 1 wherein the electrolyte includes inorganic components.

24. The rapidly rechargeable battery of claim 1 further comprising a battery vessel, wherein the battery vessel is substantially gas tight.

25. The rapidly rechargeable battery of claim 1, wherein each electrode adsorbs at least 50 $cm^3$/g of a working gas during charging.

26. A method comprising:
    inserting a plurality of gas adsorbing electrodes into a gas-tight vessel, the gas adsorbing electrodes having a specific surface area greater than 500 $m^2$/g;
    disposing around the electrodes a permselective membrane, wherein the permselective membrane is substantially impermeable to the gases adsorbed on the electrodes;
    introducing an electrolyte into the gas-tight vessel, wherein, during charging, gases are adsorbed on the plurality of electrodes; and
    sealing the gas-tight vessel.

27. A rapidly rechargeable battery comprising;
    a plurality of rechargeable batteries of claim 1; and
    a plurality of electrically conductive elements configured to couple the plurality of rechargeable batteries.

28. The rapidly rechargeable battery of claim 27 wherein the plurality of rechargeable batteries are electrically connected in series.

29. The rapidly rechargeable battery of claim 27 wherein the plurality of rechargeable batteries are electrically connected in parallel.

30. The rapidly rechargeable battery of claim 27 wherein the plurality of rechargeable batteries are electrically connected in a combination of series and parallel.

31. A rapidly rechargeable battery utilizing chemical energy of gases comprising:
    one or more electrolytes;
    a plurality of gas adsorbing electrodes immersed in the electrolyte, each electrode having a specific surface area greater than 500 $m^2$/g, wherein during charging, gases are adsorbed on the plurality of electrodes; and
    a permselective membrane disposed around each electrode, wherein the permselective membrane is substantially impermeable to the gases adsorbed on the electrodes.

32. The rapidly rechargeable battery of claim 31, wherein the one or more electrolytes within the permselective membrane disposed around each electrode has a different chemical composition.

33. The rapidly rechargeable battery of claim 31, wherein the electrolyte includes a solution of chemical compounds which form positive and negative ions.

34. The rapidly rechargeable battery of claim 31, wherein the plurality of electrodes are constructed of materials including activated carbon.

35. The rapidly rechargeable battery of claim 31, wherein the plurality of electrodes are constructed of materials including tunable nanoporous carbon.

36. The rapidly rechargeable battery of claim 31, wherein the plurality of electrodes are constructed of materials including gas adsorbing nano-materials.

37. The rapidly rechargeable battery of claim 31, wherein the plurality of electrodes have varied geometries.

38. The rapidly rechargeable battery of claim 31, wherein the gases formed during charging are selected to be effectively adsorbed on the plurality of electrodes and desorbed from the plurality of electrodes during discharging.

39. The rapidly rechargeable battery of claim 31, wherein the gases formed are selected from the group consisting of: $SO_2$, $Cl_2$, $NH_3$, $H_2S$, $CO_2$, $O_2$, and $H_2$.

* * * * *